United States Patent [19]

Michos

[11] Patent Number: 5,912,037
[45] Date of Patent: Jun. 15, 1999

[54] METHOD OF REMOVING PROTEINS FROM BEVERAGES USING CROSSLINKED TANNIN/INORGANIC OXIDE COMPOSITES

[75] Inventor: Demetrius Michos, Columbia, Md.

[73] Assignee: W. R. Grace & Co. -Conn., New York, N.Y.

[21] Appl. No.: 09/017,128

[22] Filed: Feb. 2, 1998

Related U.S. Application Data

[62] Division of application No. 08/673,402, Jun. 28, 1996, Pat. No. 5,789,467.

[51] Int. Cl.⁶ .............................. C12C 3/08; A23L 3/08; A23P 1/00
[52] U.S. Cl. ..................... 426/422; 426/423; 426/495
[58] Field of Search .................... 426/422, 423, 426/495, 599, 592, 590

[56] References Cited

U.S. PATENT DOCUMENTS

| | | |
|---|---|---|
| 3,935,339 | 1/1976 | Cooke, Jr. . |
| 4,090,919 | 5/1978 | Chibata et al. .......................... 426/422 |
| 4,199,484 | 4/1980 | Murphey . |
| 4,435,529 | 3/1984 | Kaylo et al. ............................. 523/426 |
| 4,500,554 | 2/1985 | Weetall .................... 426/422 |
| 4,576,927 | 3/1986 | Kuroda et al. . |
| 4,885,207 | 12/1989 | Johnson et al. . |
| 4,969,522 | 11/1990 | Whitehurst et al. . |
| 5,032,547 | 7/1991 | Giannelis et al. . |
| 5,167,822 | 12/1992 | Simon et al. . |
| 5,234,991 | 8/1993 | Tayot et al. . |
| 5,372,820 | 12/1994 | Dorgebray et al. . |
| 5,470,463 | 11/1995 | Girot et al. . |
| 5,489,566 | 2/1996 | Dombrowski et al. . |

FOREIGN PATENT DOCUMENTS

| | | |
|---|---|---|
| 0118990 | 9/1984 | European Pat. Off. . |
| 0630858 | 6/1994 | European Pat. Off. . |
| 5346492 | 4/1978 | Japan . |
| 3109999 | 9/1978 | Japan . |
| 5653105 | 12/1981 | Japan . |
| 7313870 | 5/1995 | Japan . |

OTHER PUBLICATIONS

Min Kim et al; "Synthesis of New Polymers Containing Tannin", Journal of Applied Polymer Science, vol. 39, No. 4, pp. 855–863.

"A New Method for the Stablization of White Wine", Weetall et al Am. J. Enol. Vitic., vol. 35, No. 4, Published 1984.

Preparation of Immobilized Tannins for Protein Adsorption; Watanabe et al Journal of Solid–Phase Biochemistry, vol. 3, No. 3 published 1978.

"Immobilization of Aminoacylase by Adsorption to Tannin Immobilized on Aminohexyl Cellulose". Watanabe et al. Biotechnology and Bioengineering, Published 1979.

Primary Examiner—Anthony J. Weier
Attorney, Agent, or Firm—C. A. Cross

[57] ABSTRACT

Epoxy-polymerized tannin/inorganic oxide composite particles are obtained by polymerizing the tannin with a polyepoxy crosslinking agent in situ on inorganic oxide particles. The compositions of the invention are capable of achieving the performance of tannin in beverage treatment applications without tannin's associated filtration disadvantages.

6 Claims, No Drawings

5,912,037

METHOD OF REMOVING PROTEINS FROM BEVERAGES USING CROSSLINKED TANNIN/INORGANIC OXIDE COMPOSITES

This is a division of application Ser. No. 08/673,402, filed Jun. 28, 1996, now U.S. Pat. No. 5,789,467.

BACKGROUND OF THE INVENTION

In the history of making beverages (e.g. beer, wine, etc.) involving fermentation, many techniques have been used to improve the quality of the resulting product with respect to flavor and appearance. With the use of mass production techniques, additional concerns arise such as shelf life of the resulting product and product throughput in the manufacturing facility. Similar concerns often arise with respect to other beverages derived from fruit (e.g. apple juice).

Chill haze is often a major problem that occurs in these various beverages. Chill haze is caused by certain proteins and polyphenolic compounds which are present in the beverage. With the time delay between manufacture and consumption of mass produced beverages and the consumption of beverages in a chilled state, the development of turbidity or chill haze is exacerbated.

To avoid chill haze problems in the resulting product, beverages are typically treated (chillproofed) to remove at least a portion of the proteins and polyphenolic compounds responsible for the problem. Unfortunately, it is often difficult to remove the problematic proteins without removing other constituents which are responsible for favorable properties (e.g. flavor, foam retention, etc.) Chillproofing is made more difficult by the desire (and often the need) to avoid addition of chemicals to the beverage. Food purity law and general health concerns may arise whenever auxiliary chemicals are used in beverage manufacture.

Tannins are known chillproofing agents for beer. In some instances, tannin has been used to influence the flavor of the resulting beverage (e.g., in the making of various wines). Tannin interacts very effectively with the proteins responsible for chill haze to create a voluminous precipitate which is then removed from the beverage by filtration or decantation. Unfortunately, removal of the formed precipitate is often difficult, requiring long settling time or very slow filtration. The presence of residual tannins in the beverage may have undesired effects on the beverage flavor.

Porous adsorbents such as silica gels have also been widely used for chillproofing whereby the proteins are adsorbed and removed from the beverage by filtration or decantation. While many silicas provide adequate chillproofing performance, there is a desire to achieve better performance, especially for high volume throughput brewery operations. Typically, silicas do not chillproof as well as tannins, but they are more easily removed from the beverage by filtration compared to tannin.

Some attempts have been made in the prior art to immobilize tannin on support particles such as silica particles by use of chemical bonding agents. In U.S. Pat. No. 4,500,554, tannic acid derivatives were immobilized on a treated silica support using chemicals such as aminopropyltriethoxysilanes and sodium periodate or formaldehyde. Unfortunately, such chemical immobilization has disadvantages in that the immobilization process is expensive and that the added chemicals may present food purity issues. Techniques using formaldehyde are generally ineffective for immobilization of the type of tannin most preferred for use in beer chillproofing.

Thus, there is a need for tannin-containing compositions that do not possess the filtration problems of conventional tannins nor the problems of known immobilized tannins.

SUMMARY OF THE INVENTION

The invention provides crosslinked tannin/inorganic oxide composite particles which provide tannin functionality for all varieties of tannins without the filtration problems associated with ordinary tannins. The compositions of the invention are enabled by the use of epoxy crosslinking.

In one aspect, the invention encompasses a particulate composition comprising a composite of epoxy-polymerized tannin on inorganic oxide particles. The inorganic oxide preferably includes silica. The crosslinking agent is preferably a water-soluble diglycidyl ether.

In another aspect, the invention encompasses a method of chillproofing (protein removal from) beverages, the method comprising contacting the beverage with a particulate composition comprising a composite of epoxy-polymerized tannin on inorganic oxide particles whereby proteins are adsorbed by the composite particles, and thereafter removing the composite particles and adsorbed proteins from the beverage. Preferably, the beverage is contacted with an admixture of siliceous oxide particles with the epoxy-polymerized tannin-inorganic oxide composite particles. The method of the invention is especially useful in the chillproofing of plant-derived beverages (e.g. beer, juice, etc.).

The invention encompasses methods for making the epoxy-polymerized tannin-inorganic oxide particles of the invention. These and other aspects of the invention will be described in further detail below.

DETAILED DESCRIPTION OF THE INVENTION

The invention provides epoxy-polymerized tannin/inorganic oxide composite particles and compositions containing these composite particles. The composite particles of the invention are preferably further characterized by the absence of auxiliary chemicals adapted to bond the tannin to the inorganic oxide particles. The composite particles of the invention are preferably useful for treating beverages to provide the protein-removal benefits associated with the use of conventional tannins.

The tannin may be any known tannin material. Tannins typically contain one or more compounds selected from the group consisting of tannic acid, gallotannic acid, glucoside of tannic acid, glucoside of gallotannic acid, and mixtures thereof. Naturally-derived tannins are typically identified by the source plant (e.g., red oak tannin or sumac tannin) and/or their location of origin (e.g., Chinese galls or Bengal kino). If desired, mixtures of tannins may be used. Preferably, the tannin is one which is commonly used in the beer brewing industry (e.g. Brewtan®-Brewtan®C tannin sold by Omnichem N.V.). Brewtan® tannin is not readily polymerizable with formaldehyde due to the lower reactivity of the polyhydroxyaromatic rings (of these tannins) towards formaldehyde.

The crosslinking agent is preferably a polyepoxy compound containing at least two epoxide groups. The polyepoxy compound is preferably water-soluble. Epoxy compounds found to be particularly useful in the present invention are diepoxy compounds. A preferred diepoxy compound is 1,4-butanediol diglycidyl ether.

The amount of crosslinking agent used to polymerize the tannin maybe varied considerably. Preferably, the amount of crosslinking agent is sufficient to render the polymerized tannin insoluble in water. Preferably, the amount of crosslinking agent used is about 10–60 wt. % based on the weight of the tannin, more preferably about 20–40 wt. %.

The inorganic oxide particles may be of any type of inorganic oxide such as silica, alumina, silica aluminas, aluminosilicates, clays, acid-treated clays, alkaline earth silicates, etc. The inorganic oxide may be crystalline or amorphous. Preferably, silica is a preferred inorganic oxide. Where the compositions of the invention are to be used for chillproofing, the inorganic oxide particles are preferably of a type known to be suitable for chillproofing (preferably silica-containing particles). The inorganic oxide particles are preferably porous.

Where silica-containing particles are used as the inorganic oxide, they preferably contain amorphous silica; more preferably the silica-containing particles consist essentially of amorphous silica. Preferred amorphous silicas are those selected from the group consisting of silica gel, precipitated silica, and mixtures thereof. Preferred silica gels are selected from the group consisting of silica hydrogels, silica xerogels, and mixtures thereof. Where the starting inorganic oxide particles have significant water content (e.g. hydrogels), the process of forming the tannin/inorganic oxide composite of the invention will generally result in water removal from the particles.

The particle size distribution, porosity and surface area characteristics of the inorganic oxide particles may be varied as desired. Where the compositions of the invention are to be used for chillproofing, the physical characteristics of the inorganic oxide particles preferably correspond to those known to be especially suitable for chillproofing. Preferably, the size of the inorganic oxide particles is not so fine as to cause filtration problems when using liquid contacting applications (e.g. chillproofing). In general, the particles preferably have an average particle size of about 4–20 μm, more preferably about 7–15 μm. The inorganic oxide particles preferably have a pore volume of at least about 0.5 cc/g in the absence of the added tannin, more preferably about 0.7–1.2 cc/g. The inorganic oxide particles preferably have a surface area of at least about 250 $m^2/g$ in the absence of the added tannin, more preferably about 300–800 $m^2/g$. An average pore diameter of the inorganic oxide particles can be calculated from the surface area and pore volume of the particles. The average pore diameter for the inorganic oxide particles is preferably at least 3 nm. The measurement of porosity and surface area is preferably done after first removing the tannin from the inorganic oxide particles by dissolution. The porosity and surface area associated with the inorganic oxide particles can then be determined by conventional techniques (e.g., $N_2$-BET method).

The amount of tannin contained in the composite particles can be varied considerably. The compositions preferably contain at least about 1 part by weight tannin per 100 parts by weight of inorganic oxide, more preferably about 3–35 parts by weight tannin. The water content of the composite particles is preferably about 5 to 30 wt. %.

If desired, the tannin composites of the invention may be used in combination (admixture) with other known chillproofing agents such as silica gels (xerogels or hydrogels) or magnesium silicates. A preferred chillproofing agents for this purpose are Daraclar®7500 (Grace Davison). Where such an admixture is used, the weight ratio of the tannin composite to the other chillproofing agent is preferably about 1–5:5–1, more preferably about 1:1.

The epoxy-polymerized tannin/inorganic oxide composite particles of the invention are characterized in part by the fact that the aqueous dissolution rate of the polymerized tannin is extremely low, if not zero. The dissolution rate is preferably measured in deionized water at 20° C. where the amount of tannin in the test is about 200 mg/L of water. The dissolution test uses the ASBC method for measurement of total polyphenols adapted for measurement of tannin by calibration with standard solutions of tannin.

The compositions of the invention typically exhibit good filtration characteristics in comparison to uncomposited tannin. Use of tannin alone in beverage applications typically results in blockage of filters; physical admixtures of tannin and inorganic oxide result in slow filtration. The tannin-inorganic oxide composites of the invention preferably result in filtration rates comparable to those of the inorganic oxide particles themselves.

The epoxy-polymerized tannin-inorganic oxide composites of the invention can be manufactured by a variety of techniques. Preferably, the manufacturing technique avoids the use of non-aqueous solvents. In a preferred method, the tannin and epoxy crosslinking agent are first dissolved in water with adjustment of the pH to about 9–10. The resulting solution is then impregnated onto the inorganic oxide, preferably to the point of incipient wetness. The impregnated inorganic oxide is then heated to about 150–180° C. for a time sufficient to effect the tannin-epoxy crosslinking reaction. The resulting composite is then washed and dried.

The compositions of the invention are especially useful for chillproofing beverages. Most preferably, the compositions of the invention are used to chillproof fermented beverages such as beer. For chillproofing, the composite particles of the invention may be used at any point in the beverage manufacturing process where it is known to add tannin and/or inorganic oxide particles. For fermented beverages, the compositions of the invention are preferably added after fermentation. The dosage of the invention composition may depend on the desired degree of chillproofing and/or the particular beverage manufacturing process.

The compositions of the invention provide a combination of good chillproofing and filtration properties. These and other aspects of the invention are further illustrated by the following examples.

EXAMPLE 1

0.1427 g tannin was dissolved in 3.9 ml deionized water. 3.6 ml of 0.2N NaOH was added to raise the pH to about 9.5. 0.0838 g of 1,4 butanediol diglycidyl ether (BDE) was added to the solution. The resulting solution was then impregnated onto silica xerogel particles to the point of incipient wetness. The impregnated particles were then heated to 160° C. for about 2 hours to crosslink the tannin. The resulting composite was then washed with water and vacuum dried.

EXAMPLES 2 AND 3

The process of example 1 was repeated with 0.0204 g BDE for example 2 and 0.0102 g BDE for example 3.

EXAMPLE 4

The chillproofing performance of the materials of examples 1–3 was tested using neat samples of the materials. Samples of the silica gel (Daraclar®7500) were also tested alone for comparison. The samples were contacted with a beer A after maturation at the dosages described in Table 1. All samples were filtered through a diatomaceous earth coated filter, carbonated, bottled and pasteurized. The samples were then held at 38° C. for 6 days and then for two days at 2° C. The level of chill haze was measured in nephelometer turbidity units (NTU).

TABLE 1

| Material | Dose (g/hl) | Haze (NTU) |
|---|---|---|
| Example 1 | 60 | 4 |
| Example 2 | 60 | 5 |
| Example 3 | 60 | 2 |
| Silica gel | 60 | 6 |

EXAMPLE 5

Admixtures of a polymerized tannin composite containing 3 wt. % tannin (prepared according to example 1 with a weight ratio of tannin/BDE of 3:1) with a silica gel chill-proofing agent (DARACLAR®7500) were tested for chill-proofing performance using the procedure of example 4 using beer B. The results, including comparison with the silica gel alone, are shown in Table 2.

TABLE 2

| Material | Dose (g/hl) | Haze (NTU) |
|---|---|---|
| Silica gel | 60 | 8 |
| Silica gel + tannin composite | 40 + 20 | 6 |
| Silica gel + tannin composite | 30 + 30 | 4 |
| Silica gel + tannin composite | 20 + 40 | 6 |

What is claimed is:

1. A method of removing proteins from a protein-containing beverage, said method comprising contacting said beverage with a particulate composition comprising a composite of an epoxy-polymerized tannin on inorganic oxide wherein said tannin polymer comprises tannin crosslinked with a polyepoxy crosslinking constituent, whereby proteins are adsorbed by said composite particles and thereafter removing said composite particles and adsorbed proteins from said beverage.

2. The method of claim 1 wherein said beverage is contacted with an admixture of siliceous oxide particles with said polymerized tannin-inorganic oxide composite particles.

3. The method of claim 2 wherein said beverage is beer.

4. The method of claim 2 wherein said beverage is wine.

5. The method of claim 2 wherein said beverage is fruit juice.

6. The method of claim 2 wherein the weight ratio of said tannin composite to said siliceous oxide particles is about 1:1.

* * * * *